United States Patent
Hong (10) Patent No.: US 9,425,491 B2
(45) Date of Patent: Aug. 23, 2016

(54) SECONDARY BATTERY

(71) Applicant: Samsung SDI Co., Ltd., Yongin-si, Gyeonggi-do (KR)

(72) Inventor: Sungho Hong, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 248 days.

(21) Appl. No.: 14/095,402

(22) Filed: Dec. 3, 2013

(65) Prior Publication Data
US 2015/0064519 A1 Mar. 5, 2015

(30) Foreign Application Priority Data

Aug. 30, 2013 (KR) .................. 10-2013-0104213

(51) Int. Cl.
*H01M 10/637* (2014.01)
*H01M 2/34* (2006.01)
*H01M 2/02* (2006.01)

(52) U.S. Cl.
CPC .......... *H01M 10/637* (2015.04); *H01M 2/348* (2013.01); *H01M 2/0212* (2013.01); *H01M 10/5026* (2013.01); *H01M 2200/106* (2013.01)

(58) Field of Classification Search
CPC .......... H01M 10/5026; H01M 10/637; H01M 2200/106; H01M 2/0212; H01M 2/348
USPC .......................................... 429/62
See application file for complete search history.

(56) References Cited

U.S. PATENT DOCUMENTS

| 2010/0098974 | A1 | 4/2010 | Kim et al. | |
| 2011/0039134 | A1 | 2/2011 | Kim et al. | |
| 2011/0080140 | A1* | 4/2011 | Hogari | H01M 10/486 320/134 |
| 2012/0009467 | A1* | 1/2012 | Park | H01M 2/0212 429/178 |
| 2013/0089762 | A1 | 4/2013 | Hong | |

FOREIGN PATENT DOCUMENTS

| KR | 2010-0044487 A | 4/2010 |
| KR | 2011-0016821 A | 2/2011 |
| KR | 2013-0038142 A | 4/2013 |

* cited by examiner

*Primary Examiner* — Jonathan Jelsma
*Assistant Examiner* — Rashid Alam
(74) *Attorney, Agent, or Firm* — Knobbe Martens Olson & Bear LLP (57) ABSTRACT

A secondary battery with improved heat transmitting efficiency and coupling force between an electrode tab and a temperature protection device. The secondary battery includes an electrode assembly including a first electrode having a first electrode tab extending to one side, a second electrode having a second electrode tab extending to one side, and a separator disposed between the first electrode and the second electrode, a pouch that includes a terrace part and a temperature protection device mounted on the terrace part and connected to the first electrode tab. The temperature protection device includes a first connection part connected to a first extension part, a transmission part in contact with the first electrode tab and connected to the first connection part, and a second connection part connected to the transmission part.

20 Claims, 5 Drawing Sheets

SECONDARY BATTERY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

This application claims priority to and the benefit of Korean Patent Application No. 10-2013-0104213, filed on Aug. 30, 2013, the entire content of which is incorporated herein by reference.

BACKGROUND

1. Field

Aspects of the present invention relate to a secondary battery.

2. Description of the Related Technology

In general, a secondary battery includes an electrode assembly and an electrolytic solution housed in a can. The electrode assembly includes a positive electrode plate, a separator and a negative electrode plate. The positive electrode plate (or the negative electrode plate) includes a foil-type positive electrode (or negative electrode) collector, and a positive electrode (or negative electrode) active material coated on the collector.

Here, an uncoated portion is formed on the collector of the electrode plate, and an electrode tab is generally welded to the uncoated portion to be connected to an external circuit.

SUMMARY OF CERTAIN INVENTIVE ASPECTS

Aspects of the present invention provide a secondary battery, which can improve heat transmitting efficiency between an electrode tab and a temperature protection device.

Other aspects of the present invention provide a secondary battery, which can improve a coupling force between an electrode tab and a temperature protection device.

In accordance with one aspect of the present invention, there is provided a secondary battery including an electrode assembly including a first electrode having a first electrode tab extending to one side, a second electrode having a second electrode tab extending to one side, and a separator disposed between the first electrode and the second electrode, a pouch accommodating the electrode assembly and including a terrace part from which the first electrode tab and the second electrode tab are drawn, and a temperature protection device mounted on the terrace part and connected to the first electrode tab, wherein a first extension part extends and is bent at an end of the first electrode tab, and the temperature protection device includes a first connection part connected to the first extension part, a transmission part having a bottom surface making contact with a top surface of the first electrode tab and connected to the first connection part, and a second connection part connected to the transmission part.

A connection tab may be connected to the second connection part.

When the temperature of the electrode assembly exceeds a preset value, electric resistance of the temperature protection device may increase until the current flowing between the connection tab and the first electrode tab is electrically cut off.

The transmission part may be fixed to the terrace part of the pouch using a double-sided tape.

The temperature protection device may be a positive temperature coefficient resistor.

The bottom surface of the transmission part of the temperature protection device may be welded to the top surface of the first electrode tab.

A thermally conductive member may intervene between the bottom surface of the transmission part of the temperature protection device and the top surface of the first electrode tab.

A second extension part extending in a direction opposite to the first extension part may further be formed at the end of the first electrode tab.

The bottom surface of the transmission part of the temperature protection device may make contact with a top surface of the second extension part.

In addition, the bottom surface of the transmission part of the temperature protection device may be welded to the top surface of the second extension part.

A thermally conductive member may intervene between the bottom surface of the transmission part of the second extension part.

The first extension part may be bent in parallel with the positive electrode tab and may make contact with the bottom surface of the first connection part.

An insulating tape may further be provided on the terrace part, the insulating tape covering a portion of the positive electrode tab, a portion of the connection tab and the temperature protection device.

As described above, the secondary battery according to the present invention provide a secondary battery can improve heat transmitting efficiency between an electrode tab and a temperature protection device.

In addition, the secondary battery according to the present invention can provide a secondary battery which can improve a coupling force between an electrode tab and a temperature protection device.

Additional aspects and/or advantages of the invention will be set forth in part in the description which follows and, in part, will be obvious from the description, or may be learned by practice of the invention.

BRIEF DESCRIPTION OF THE DRAWINGS

The objects, features and advantages of the present invention will be more apparent from the following detailed description in conjunction with the accompanying drawings, in which.

DETAILED DESCRIPTION OF ONE EMBODIMENT OF THE INVENTION

Hereinafter, examples of embodiments of the invention will be described in detail with reference to the accompanying drawings.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In the drawings, the thickness and size of an electrode tab or a temperature protection device are exaggerated for clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

A pouch-type secondary battery is configured such that an electrode assembly is formed by stacking a positive electrode and a negative electrode on both surfaces of a polymer film allowing a lithium ion to pass, an outer case member is disposed on both surfaces of the electrode assembly and peripheral portions of the outer case member are thermally fused to form a pouch, and the electrode assembly is housed in the pouch.

A positive electrode tab connected to the positive electrode of the electrode assembly and a negative electrode tab connected to the negative electrode of the electrode assembly, are drawn to one side of the pouch. The positive electrode tab and the negative electrode tab are electrically connected to a protection circuit module (PCM) for mounting protection circuit components.

The PCM is formed to prevent over-charge, over-discharge, over-current and short circuit of the secondary battery. In addition, a temperature protection device having a positive temperature coefficient between the PCM and the positive electrode tab may also be used.

When a temperature of the secondary battery reaches a preset risk level, the temperature protection device, that is, a thermal-cut-off (TCO), electrically cuts off the positive electrode tab and the PCM, and when temperature of the secondary battery reaches a preset safety level, the temperature protection device electrically connects the positive electrode tab and the PCM. Accordingly, the temperature protection device should have good temperature sensing performance of the secondary battery.

Figure 1:
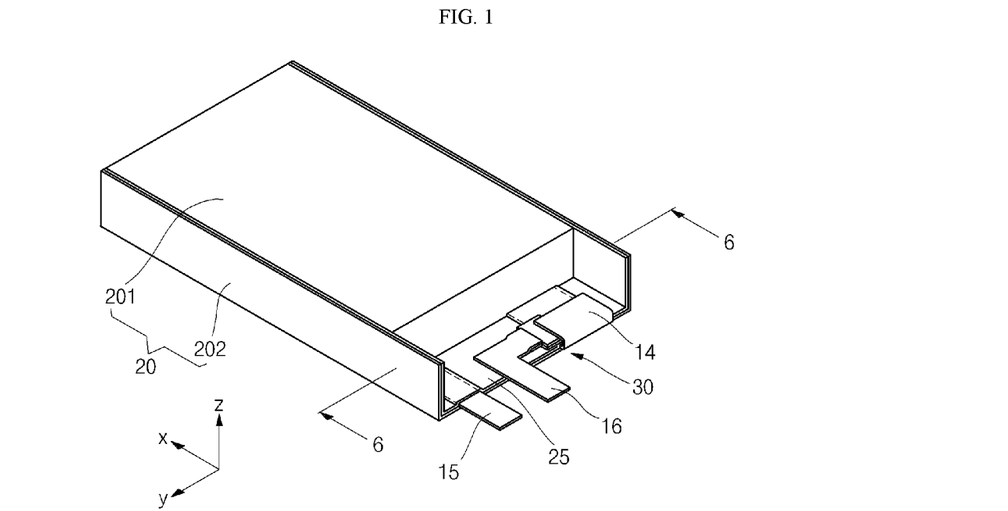
FIG. 1 is a perspective view of a secondary battery according to an embodiment of the present invention.
Figure 2:
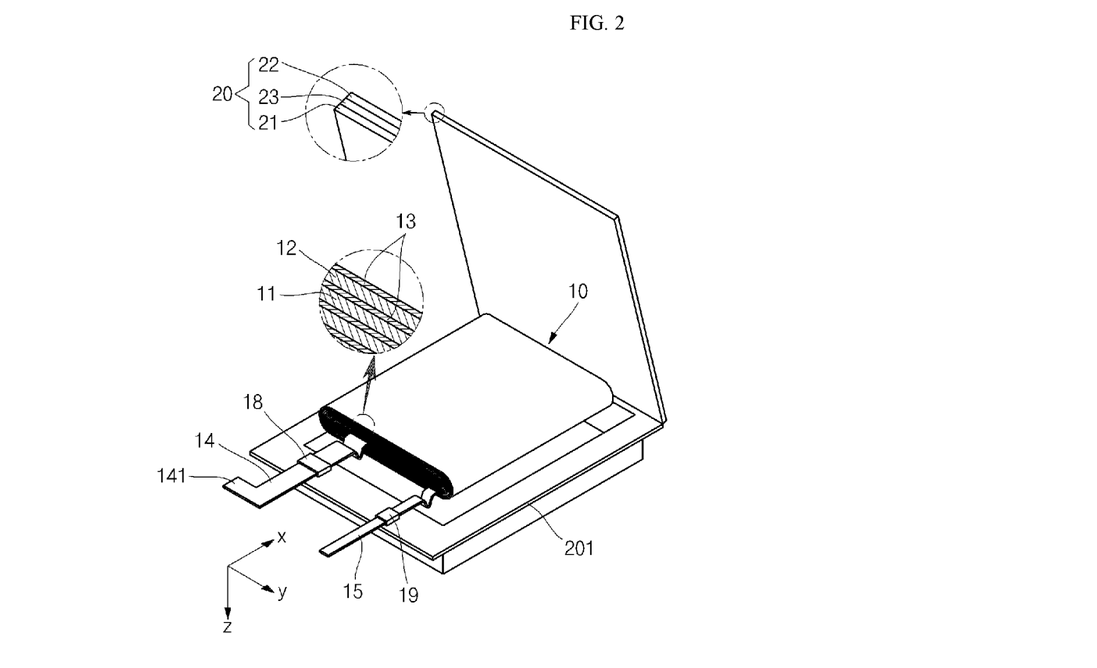
FIG. 2 is a perspective view illustrating an electrode assembly and a pouch of the secondary battery shown in FIG. 1 are disassembled from each other.
Figure 3:
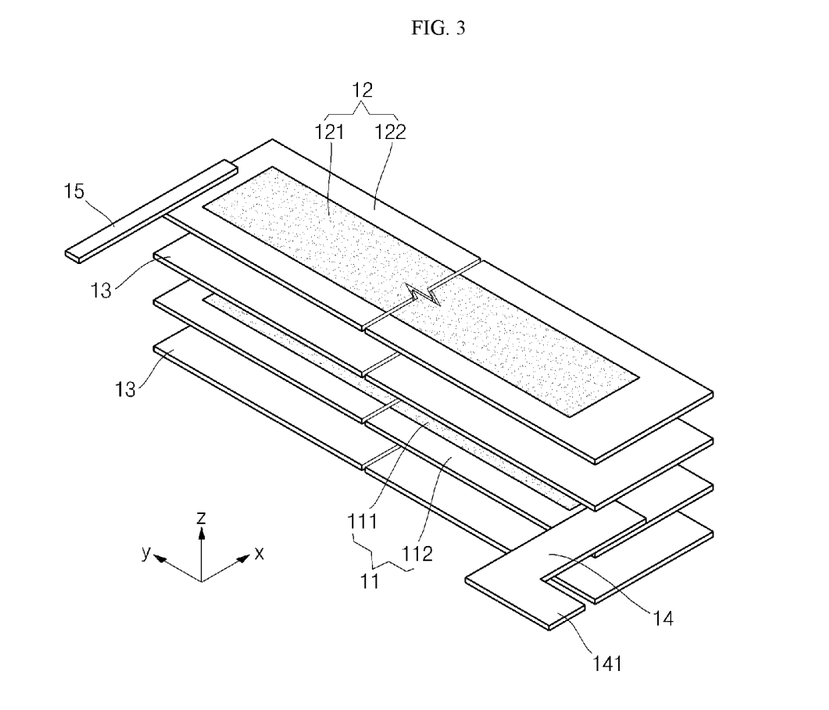
FIG. 3 is an exploded perspective view illustrating an electrode assembly in the secondary battery shown in FIG. 1.

FIG. 1 is a perspective view of a secondary battery according to an embodiment of the present invention, FIG. 2 is a perspective view illustrating an electrode assembly and a pouch of the secondary battery shown in FIG. 1 are dissembled, and FIG. 3 is an exploded perspective view illustrating an electrode assembly in the secondary battery shown in FIG. 1.

Referring to FIGS. 1 to 3, the secondary battery according to the embodiment of the present invention includes an electrode assembly 10, and a pouch 20 housing the electrode assembly 10.

The electrode assembly 10 is formed by winding in a jelly-roll configuration a first electrode (to be referred to as a "positive electrode" hereinafter) 11 and a second electrode (to be referred to as a "negative electrode" hereinafter) 12 with a separator 13 disposed therebetween.

The positive electrode 11 includes a positive electrode active material layer 111 coated on both surfaces of a positive electrode current collector formed of a highly conductive metal thin plate, for example, an aluminum (Al) foil. A chalcogenide compound is used as an active material of the positive electrode active material layer 111, and examples of the active material may include, but not limited to, composite metal oxides, such as $LiCoO_2$, $LiMn_2O_4$, $LiNiO_2$, $LiNi_{1-x}Co_xO_2$ (0<x<1), or $LiMnO_2$. In addition, the positive electrode 11 includes an uncoated portion 112 to which a positive electrode tab 14 to be described later is attached and which is not coated with the positive electrode active material layer 111.

The negative electrode 12 includes a negative electrode active material layer 121 coated on both surfaces of a negative electrode current collector formed of a conductive metal thin plate, for example, a copper (Cu) or nickel (Ni) foil. Examples of the active material of the negative electrode active material layer 121 may include, but not limited to, carbon (C) based materials, Si, Sn, tin oxide, composite tin alloys, transition metal oxides, lithium metal nitrides or lithium metal oxides. In addition, the negative electrode 12 includes an uncoated portion 122 to which a negative electrode tab 15 to be described later is attached and which is not coated with the negative electrode active material layer 121.

The separator 13 inhibits a short between the negative electrode 12 and the positive electrode 11 while allowing charges of the secondary battery, e.g., lithium ions, to move, and may include, but not limited to, one selected from the group consisting of polyethylene, polypropylene and a copolymer of polyethylene and polypropylene. Preferably, the separator 13 is constructed such that it has a width greater than that of the positive electrode 11 or the negative electrode 12, which is advantageous in preventing the short between the negative electrode 12 and the positive electrode 11.

The positive electrode tab 14 and the negative electrode tab 15 are drawn to the same surface of the electrode assembly 10 (e.g., a y-z plane). In addition, although not shown, the positive electrode tab 14 and the negative electrode tab 15 may be disposed on opposite surfaces of the electrode assembly 10 (e.g., opposite ends of the x axis of FIG. 1).

Referring again to FIG. 2, the pouch 20 may be formed of multi-layered sheets surrounding exterior portions of the electrode assembly 10. For example, the pouch 20 includes a polymer sheet 21 forming an inner surface of the pouch 20 and functioning for insulation and thermal fusion, a polyethyleneterephthalate PET sheet, a nylon sheet or a PET-nylon composite sheet (for brevity, to be referred to as a "nylon sheet" hereinafter) 22 forming an outer surface of the pouch 20 to protect the pouch 20, and a metal sheet 23 providing mechanical strength to the pouch 20. The metal sheet 23 is interposed between the polymer sheet 21 and the nylon sheet 22 and may be formed of, for example, an Al sheet.

Referring again to FIGS. 1 and 2, the pouch 20 includes a first outer case member 201 accommodating the electrode assembly 10, and a second outer case member 202 covering the electrode assembly 10 and thermally fused to the first outer case member 201 at the outside of the electrode assembly 10. Each of the first and second outer case members 201 and 202 may include the polymer sheet 21, the nylon sheet 22 and the metal sheet 23 having the same configuration.

For example, the first outer case member 201 is formed to have a concave structure to accommodate the electrode assembly 10, and the second outer case member 202 is flatly formed to cover the electrode assembly 10 accommodated in the first outer case member 201.

In addition, the electrode assembly 10 is formed in a flat panel structure of a rectangular parallelepiped. Accordingly, the pouch 20 is also formed in a flat panel structure of a rectangular parallelepiped. Since the secondary battery is formed by surrounding the electrode assembly 10 with the pouch 20, the overall configuration of the secondary battery may have a flat panel structure of a rectangular parallelepiped.

The first electrode tab (to be referred to as "positive electrode tab" hereinafter) 14 and the second electrode tab (to be referred to as "negative electrode tab" hereinafter) 15 are connected to the outside of the thermally fused pouch 20 to then electrically drawing the electrode assembly 10 to the outside of the pouch 20. That is to say, the positive electrode tab 14 and the negative electrode tab 15 are disposed to pass through a portion between the first and second outer case members 201 and 202 thermally fused at the terrace part 25 formed on one surface of the pouch 20 (that is, the y-z plane). Here, the positive electrode tab 14 and the negative electrode tab 15 are electrically insulated from the pouch 20 by insulating members 18 and 19.

In addition, the terrace portion 25 may be formed by thermally adhering the first exterior material 201 bent along the electrode assembly 10 at the drawn-out side of the positive electrode lead tab 14 and the negative electrode lead tab 15 to a flat bottom side of the second exterior material 202.

In order to protect the secondary battery from over-charge, over-discharge, over-current or external short, the secondary battery may include a PCM (not shown) formed by mounting protection circuit devices on a circuit board. The PCM may be positioned at the terrace part 25.

The negative electrode tab 15 is directly connected to the PCM and the positive electrode tab 14 is connected to the PCM with a temperature protection device 30 intervening therebetween. Specifically, the positive electrode tab 14 is connected to a connection tab 16 directly connected to the PCM through the temperature protection device 30. Therefore, the connection tab 16 protrudes to the outside of the terrace portion 25 in a location that may be closer to the negative electrode lead tab 15 from the positive electrode lead tab 14 along the y-axis direction. Here, the temperature protection device 30 has a positive temperature coefficient that greatly increases at a preset temperature.

The positive electrode tab 14 is formed to have a larger area than the negative electrode tab 15 so as to directly contact a bottom surface of the temperature protection device 30. In addition, a first extension part 141 extending to the outside from the central axis of the electrode assembly 10 is formed at an end of the positive electrode tab 14. Here, a connection mechanism between the positive electrode tab 14 and the temperature protection device 30 will be described in more detail with reference to the accompanying drawings.

Figure 4A:
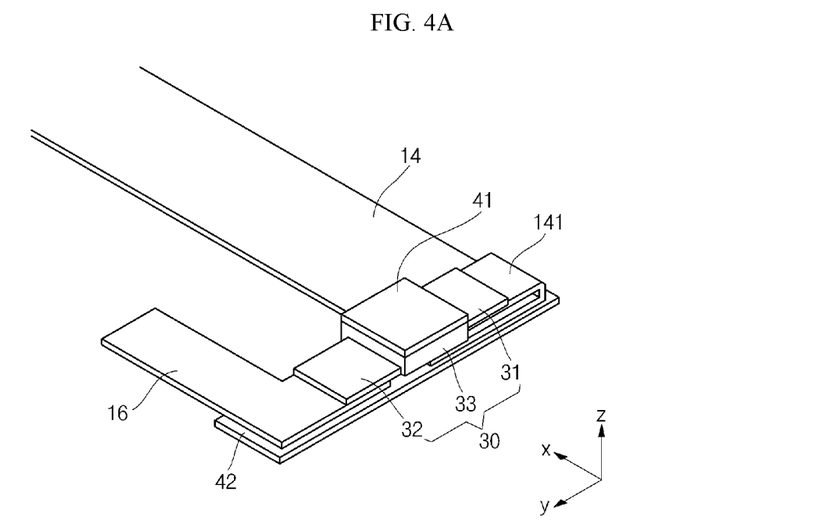
FIG. 4A is a perspective view illustrating a positive electrode tab and a temperature protection device of the secondary battery shown in FIG. 1 are assembled.
Figure 4B:
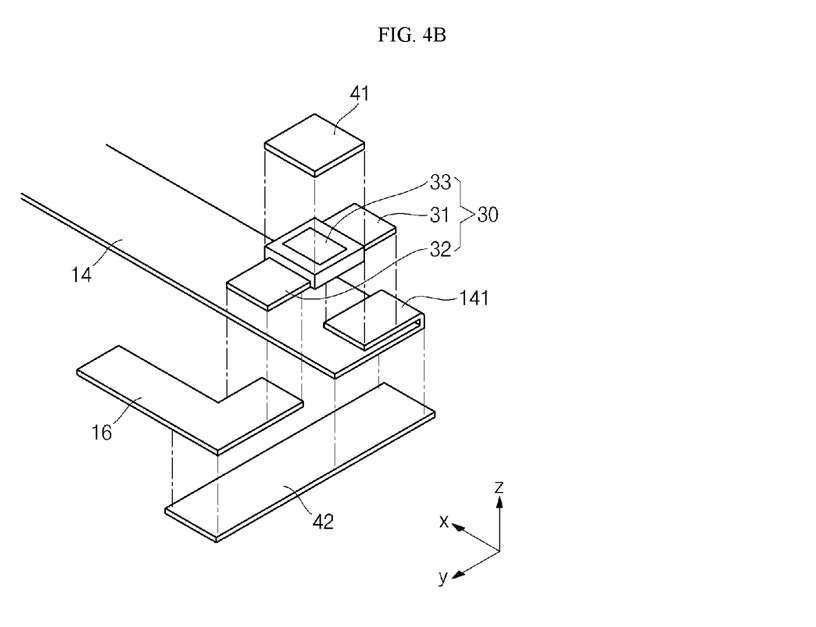
FIG. 4B is a perspective view illustrating a positive electrode tab and a temperature protection device of the secondary battery shown in FIG. 1 are disassembled from each other.

FIG. 4A is a perspective view illustrating a positive electrode tab and a temperature protection device of the secondary battery shown in FIG. 1 are assembled and FIG. 4B is a perspective view illustrating a positive electrode tab and a temperature protection device of the secondary battery shown in FIG. 1 are dissembled. FIGS. 4A and 4B illustrate the connection tap 16 before it is bent in the manner shown in FIG. 1.

Referring to FIGS. 1, 4A and 4B, the positive electrode tab 14 is drawn to the outside of the pouch 20 to then be mechanically, electrically and thermally connected to the temperature protection device 30.

For example, the temperature protection device 30 includes a first connection part 31 connected to the first extension part 141 of the positive electrode tab 14, a transmission part 33 connected to both of the first connection part 31 and the positive electrode tab 14, and a second connection part 32 connected to the transmission part 33.

The first extension part 141 extends from the end of the positive electrode tab 14 and is bent to an upper portion of the positive electrode tab 14. Here, the first extension part 141 is bent in parallel to the positive electrode tab 14 to be connected to the bottom surface of the first connection part 31 by welding. That is to say, the first extension part 141 mechanically supports first connection part 31 while being electrically connected to the first connection part 31.

The second connection part 32 and the connection tab 16 are connected to each other by welding.

The transmission part 33 transmits heat to the inside of the temperature protection device 30 having a positive temperature coefficient. Here, the internal structure of the temperature protection device 30 is widely known in the art, and a detailed description thereof will be omitted. Here, a bottom surface of the transmission part 33 is mechanically brought into direct contact with one surface of the positive electrode tab 14. Here, the bottom surface of the transmission part 33 may be coupled to one surface of the positive electrode tab 14 by welding. Therefore, the heat generated from the electrode assembly 10 is directly transmitted to the outside of the temperature protection device 30 from the positive electrode tab 14. That is to say, since a heat transmitting path is short, a loss in the heat can be minimized in transmitting the heat generated from the electrode assembly 10 to the inside of the temperature protection device 30.

When the temperature of the secondary battery reaches a preset level due to heat transmission by the transmission part 33, the temperature protection device 30 may cut off the current flowing between the positive electrode tab 14 and the connection tab 16.

In addition, a double-sided tape 41 is positioned on a top surface of the transmission part 33 of the temperature protection device 30 to then be adhered to the terrace part 25 of the pouch 20, and the connection tab 16 protrudes to the outside of the terrace portion 25 in a location that may be closer to the negative electrode lead tab 15 from the positive electrode lead tab 14 along the y-axis direction.

Therefore, the heat generated from the electrode assembly 10 and then transmitted from the pouch 20 is transmitted through the transmission portion 33 attached to the terrace portion 25 and then sensed by the temperature protection element 30. Thus, the temperature protection element 30 can detect an accurate temperature of the rechargeable battery, generated from the electrode assembly 10.

As a matter of convenience, the transmission part 33 adhered to the terrace part 25 using the double-sided tape 41 is exemplified in FIG. 1. Therefore, the connection mechanism between the second connection part 32 and the connection tab 16 can be stably maintained even when the second connection part 32 is shorter than the first connection part 31.

As described above, the temperature protection device 30 is connected to the positive electrode tab 14 at the outside of the pouch 20, and the connection tab 16 is connected to the temperature protection device 30. In addition, the connection tab 16 is electrically connected to the PCM (not shown) together with the negative electrode tab 15.

Here, an insulation tape 42 wholly covers the temperature protection element 30, that is, covers the first and second connection portions 31 and 32 connected to the transmission portion 33, covers a connection portion of the first connection portion 31, the extension portion 34 and the positive electrode lead tab 14, and may be attached to the terrace portion 25 by covering the connection tab 16 portion of the second connection portion 32.

Figure 5:
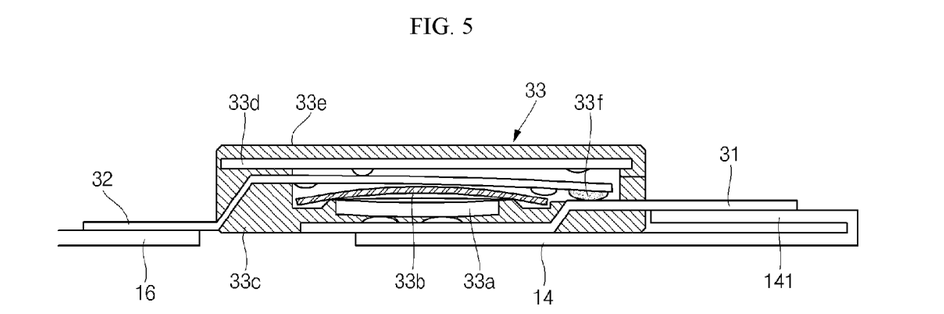
FIG. 5 is a cross-sectional view illustrating internal structures of a positive electrode tab and a temperature protection device.

FIG. 5 is a cross-sectional view illustrating internal structures of a positive electrode tab and a temperature protection device.

Referring to FIG. 5, the temperature protection device 30 may be formed by fastening a base 33c and a cover 33e, and may include a first connection part 31, a transmission part 33 and a second connection part 32. A positive temperature coefficient (PTC) device 33a makes contact with the first connection part 31 within the transmission part 33, and a bi-metal disk 33b makes contact with a top surface of the PTC device 33a within the transmission part 33. The second connection part 32 makes contact with the first connection part 31 at a contact point 33f, and the second connection part 32 makes contact with the bi-metal disk 33b. The first connection part 31 extends to the inside of the transmission part 33 and is partially exposed to its bottom surface.

Therefore, the first connection part 31 and the second connection part 32 make contact with each other and are electrically connected to each other. If the heat is directly transmitted to the portion of the first connection part 31 exposed through the bottom surface of the transmission part 33 through the positive electrode tab 14, the PTC device 33a is heated to invert the bi-metal disk 33b. If the inverted bi-metal disk 33b pushes the second connection part 32 toward the top surface of the transmission part 33 (specifically, a cover plate 33d), the first connection part 31 and the second connection part 32 are separated from each other, resulting in electrical cut-off.

Figure 6:
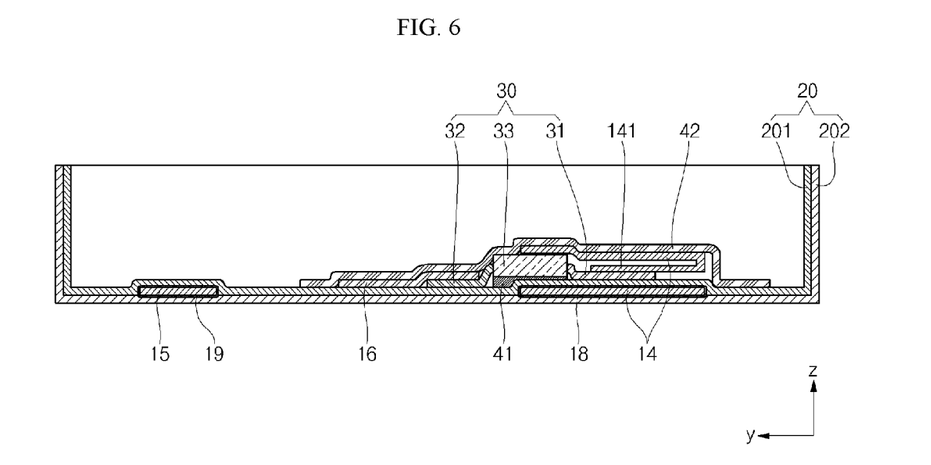
FIG. 6 is a cross-sectional view taken along the line 6-6 of FIG. 1.

FIG. 6 is a cross-sectional view taken along the line 6-6 of FIG. 1.

Referring to FIG. 6, the first connection part 31 of the temperature protection device 30 makes contact with the positive electrode tab 14 by the first extension part 141 extending from the positive electrode tab 14 while being pressed toward the pouch 20. In addition, the bottom surface of the transmission part 33 of the temperature protection device 30 is brought into direct contact with a portion of the positive electrode tab 14 while being pressed toward the pouch 20. Therefore, as described above, heat transmitting efficiency between the positive electrode tab 14 and the temperature protection device 30 can be improved, and a coupling force between the positive electrode tab 14 and the temperature protection device 30 can also be improved.

Here, the first connection part 31 may be electrically insulated by the nylon sheet 22 disposed on the outer surface of the pouch 20. In addition, although not shown, when the outer surface of the pouch 20 is coated with a conductive material to form an electrically conducting structure between the first connection part 31 and the pouch 20, the pouch 20 may have a positive polarity.

Next, a secondary battery according to another embodiment of the present invention will be described with reference to FIG. 7.

Figure 7:
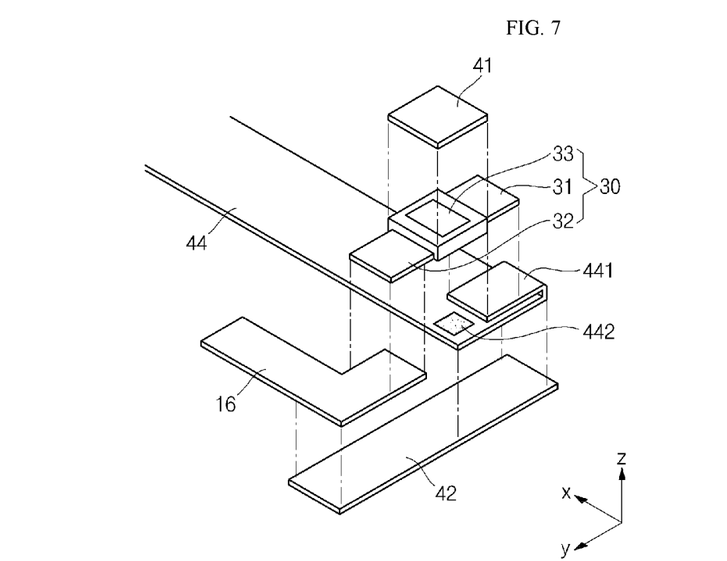
FIG. 7 is an exploded perspective view illustrating an electrode assembly and a pouch of a secondary battery according to another embodiment of the present invention.

FIG. 7 is an exploded perspective view illustrating an electrode assembly and a pouch of a secondary battery according to another embodiment of the present invention.

Referring to FIG. 7 with FIG. 4B for comparison, the secondary battery according to the embodiment of the present invention is different from the secondary battery according to the previous embodiment in view of a configuration of a positive electrode tab 44. Therefore, the following description of the secondary battery according to the embodiment of the present invention will focus on the positive electrode tab 44. In addition, in the secondary battery according to the embodiment of the present invention, the same or similar functional components as those shown in FIG. 4B will be denoted by the same reference numerals, and detailed descriptions thereof will be omitted.

Referring to FIG. 7, in the secondary battery according to the embodiment of the present invention, a first extension part 441 extending to the outside from the central axis of the electrode assembly 10 is formed at an end of the positive electrode tab 44. That is to say, as described above, the first extension part 441 makes contact with a first connection part 31 of the temperature protection device 30.

In addition, in the secondary battery according to the embodiment of the present invention, a thermally conductive member 442 is formed at the end of the positive electrode tab 44, that is, a portion directly contacting a bottom surface of the transmission part 33 of the temperature protection device 30. Here, the thermally conductive member 442 is made of a thermal interface material (TIM) and may be adhered in a tape type or may be directly coated on the portion of the positive electrode tab 44. Accordingly, since the thermally conductive member 442 intervenes between the bottom surface of the transmission part 33 of the temperature protection device 30 and the positive electrode tab 44, the heat transmitted through the positive electrode tab 44 may be transmitted to the transmission part 30 more rapidly and more easily by the thermally conductive member 442.

Next, a secondary battery according to still another embodiment of the present invention will be described with reference to FIG. 8.

Figure 8:
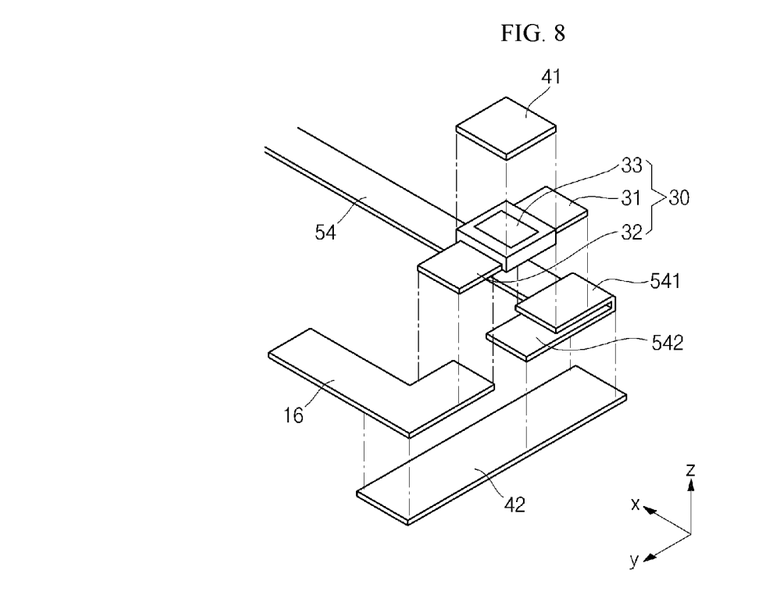
FIG. 8 is an exploded perspective view illustrating an electrode assembly and a pouch of a secondary battery according to still another embodiment of the present invention.

FIG. 8 is an exploded perspective view illustrating an electrode assembly and a pouch of a secondary battery according to still another embodiment of the present invention.

Referring to FIG. 8 with FIG. 4B for comparison, the secondary battery according to the embodiment of the present invention is different from the secondary battery according to the previous embodiment in view of a configuration of a positive electrode tab 54. In addition, in the secondary battery according to the embodiment of the present invention, the same or similar functional components as those shown in FIG. 4B will be denoted by the same reference numerals, and detailed descriptions thereof will be omitted.

Referring to FIG. 8, in the secondary battery according to the embodiment of the present invention, a first extension part 541 extending in a first direction to the outside from the central axis of the electrode assembly 10 is formed at an end of the positive electrode tab 54. That is to say, as described above, the first extension part 541 makes contact with a first connection part 31 of the temperature protection device 30.

In addition, in the secondary battery according to the embodiment of the present invention, a second extension part 542 extending in a second direction to the outside from the central axis of the electrode assembly 10 is formed at the end of the positive electrode tab 54. Here, the second direction is opposite to the first direction. Therefore, in the secondary battery according to the embodiment of the present invention, the positive electrode tab 54 has a substantially "T" shape before the first extension part 541 is bent. That is to say, the positive electrode tab 54 may be formed to have the same thickness as a negative electrode tab.

When the second extension part 542 is connected to the temperature protection device 30, it is brought into direct contact with a bottom surface of the transmission part 33. Here, the second extension part 542 and the transmission part 33 may be directly connected to each other by welding. In addition, as described above, a separate thermally conductive member (not shown) may intervene between the second extension part 542 and the transmission part 33, thereby improving heat transmitting efficiency.

Although secondary batteries according to exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery, comprising:
an electrode assembly including a first electrode having a first electrode tab extending to one side, a second electrode having a second electrode tab extending to one side, and a separator disposed between the first electrode and the second electrode;
a pouch accommodating the electrode assembly and including a terrace part from which the first electrode tab and the second electrode tab are drawn; and
a temperature protection device comprising a positive temperature coefficient device and a bi-metal disk, wherein the temperature protection device is mounted on the terrace part and connected to the first electrode tab,
wherein a first extension part extends and is bent at an end of the first electrode tab, and the temperature protection device includes a first connection part connected to the first extension part, a transmission part having a bottom surface making contact with a top surface of the first electrode tab and connected to the first connection part, and a second connection part connected to the transmission part, wherein the positive temperature coefficient device is connected to the first electrode tab, wherein the second connection part makes contact with the first connection part at a contact point, wherein the second connection part makes contact with the bi-metal disk, and wherein the first connection part extends to the inside of the transmission part and is partially exposed to a bottom surface of the transmission part.

2. The secondary battery of claim 1, wherein a connection tab is connected to the second connection part.

3. The secondary battery of claim 2, wherein when the temperature of the electrode assembly exceeds a preset value, electric resistance of the temperature protection device increases until the current flowing between the connection tab and the first electrode tab is electrically cut off.

4. The secondary battery of claim 1, wherein the transmission part is fixed to the terrace part of the pouch using a double-sided tape.

5. The secondary battery of claim 1, wherein the positive temperature coefficient device is a positive temperature coefficient resistor.

6. The secondary battery of claim 1, wherein the bottom surface of the transmission part of the temperature protection device is welded to the top surface of the first electrode tab.

7. The secondary battery of claim 1, wherein a thermally conductive member is interposed between the bottom surface of the transmission part of the temperature protection device and the top surface of the first electrode tab.

8. The secondary battery of claim 1, wherein a second extension part extending in a direction parallel to the first extension part is further formed at the end of the first electrode tab.

9. The secondary battery of claim 8, wherein the bottom surface of the transmission part of the temperature protection device makes contact with a top surface of the second extension part.

10. The secondary battery of claim 9, wherein the bottom surface of the transmission part of the temperature protection device is welded to the top surface of the second extension part.

11. The secondary battery of claim 9, wherein a thermally conductive member is interposed between the bottom surface of the transmission part of the second extension part.

12. The secondary battery of claim 1, wherein the first extension part is bent in parallel with the positive electrode tab and makes contact with the bottom surface of the first connection part.

13. The secondary battery of claim 2, wherein an insulating tape is further provided on the terrace part, the insulating tape covering a portion of the positive electrode tab, a portion of the connection tab and the temperature protection device.

14. A secondary battery comprising;
an electrode assembly having a first and second electrode tab that extend to one side;
a pouch that receives the electrode assembly that has a terrace part that receive the first and second electrode tab;
a temperature protection device comprising a positive temperature coefficient device and a bi-metal disk, wherein the temperature protection device is mounted on the terrace part and connected to the first electrode tab;
wherein the first electrode tab includes a first extension part at the end of the first electrode tab and wherein the first extension tab is bent so as to be positioned over the end of the first electrode tab and wherein the first extension part is coupled to the temperature protection device, wherein the temperature protection device includes a first connection part connected to the first extension part, a transmission part having a bottom surface making contact with a top surface of the first electrode tab and connected to the first connection part, and a second connection part connected to the transmission part, wherein the positive temperature coefficient device is connected to the first electrode tab, and wherein the second connection part makes contact with the first connection part at a contact point, wherein the second connection part makes contact with the bi-metal disk, wherein the first connection part extends to the inside of the transmission part and is partially exposed to a bottom surface of the transmission part.

15. The secondary battery of claim 14, wherein the temperature protection device includes a first connection part connected to the first extension part, a transmission part having a bottom surface that is connected to the top surface of the first electrode tab and connected to the first connection part and a second connection part connected to the transmission part.

16. The secondary battery of claim 14, wherein the transmission part is fixed to the terrace part of the pouch using a double-sided tape.

17. The secondary battery of claim 14, wherein the bottom surface of the transmission part of the temperature protection device is welded to the top surface of the first electrode tab.

18. The secondary battery of claim 14, wherein a thermally conductive member intervenes between the bottom surface of the transmission part of the temperature protection device and the top surface of the first electrode tab.

19. The secondary battery of claim 14, wherein a second extension part extending in a direction opposite to the first extension part is further formed at the end of the first electrode tab.

20. The secondary battery of claim 19, wherein the bottom surface of the transmission part of the temperature protection device makes contact with a top surface of the second extension part.

* * * * *